United States Patent
Rehrig et al.

(10) Patent No.: US 9,211,634 B2
(45) Date of Patent: Dec. 15, 2015

(54) ABRASIVE ARTICLES INCLUDING ABRASIVE PARTICLES BONDED TO AN ELONGATED SUBSTRATE BODY HAVING A BARRIER LAYER, AND METHODS OF FORMING THEREOF

(71) Applicants: SAINT-GOBAIN ABRASIVES, INC., Worcester, MA (US); SAINT-GOBAIN ABRASIFS, Conflans-Sainte-Honorine (FR)

(72) Inventors: Paul W. Rehrig, Sterling, MA (US); Yinggang Tian, Shrewsbury, MA (US); Arup K. Khaund, Northborough, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 16 days.

(21) Appl. No.: 13/627,789

(22) Filed: Sep. 26, 2012

(65) Prior Publication Data

US 2013/0084786 A1  Apr. 4, 2013

Related U.S. Application Data

(60) Provisional application No. 61/541,007, filed on Sep. 29, 2011.

(51) Int. Cl.
*B24B 21/00* (2006.01)
*B28D 1/08* (2006.01)
(Continued)

(52) U.S. Cl.
CPC .............. *B24D 18/00* (2013.01); *B23D 61/185* (2013.01); *B23D 65/00* (2013.01); *B24B 27/0633* (2013.01); *B24D 3/06* (2013.01)

(58) Field of Classification Search
CPC ...... B24B 21/00; B24B 27/0633; B28D 1/08; B28D 5/045; B28D 5/00; B23D 63/00; B23D 65/00; B23D 61/185
USPC ............................ 451/296; 125/16.02, 21, 22
See application file for complete search history.

(56) References Cited

U.S. PATENT DOCUMENTS 2,764,543 A    9/1952   Comstock, III et al.
2,784,536 A    3/1957   Barron
(Continued)

FOREIGN PATENT DOCUMENTS

CH    599837 A5    5/1978
CN   1456410 A   11/2003
(Continued)

OTHER PUBLICATIONS

Higashi et al, "Development of Low Melting Temperature Coating Materials for High Performance Diamonds Wire Saw: Effect of an Additive on Mechanical Properties", Journal of the Society of Materials Science, Japan, vol. 59, No. 6, pp. 418-422, Jun. 2010.
(Continued)

*Primary Examiner* — Robert Rose
(74) *Attorney, Agent, or Firm* — Abel Law Group, LLP; Joseph P Sullivan (57) ABSTRACT

An abrasive article including a substrate in the form of an elongated member having a core and a barrier layer in direct contact with an peripheral surface of the core. The barrier layer consists essentially of tin. A bonding layer is overlying the elongated substrate and abrasive particles are secured in the bonding layer.

20 Claims, 3 Drawing Sheets

(51) Int. Cl.
  *B24D 18/00* (2006.01)
  *B24B 27/06* (2006.01)
  *B23D 61/18* (2006.01)
  *B23D 65/00* (2006.01)
  *B24D 3/06* (2006.01)

(56) References Cited

U.S. PATENT DOCUMENTS

| | | |
|---|---|---|
| 2,793,478 A | 5/1957 | Rohowetz |
| 3,150,470 A | 9/1964 | Barron |
| 3,178,273 A | 4/1965 | Libal |
| 3,854,898 A | 12/1974 | Whitney, Jr. et al. |
| 3,884,212 A | 5/1975 | Armstrong et al. |
| 3,894,673 A | 7/1975 | Lowder et al. |
| 3,906,684 A | 9/1975 | Marshall et al. |
| 3,997,302 A | 12/1976 | Supkis |
| 3,997,902 A | 12/1976 | Nard |
| 4,015,931 A | 4/1977 | Thankur |
| 4,018,576 A | 4/1977 | Lowder et al. |
| 4,055,700 A | 10/1977 | Ronnquist et al. |
| 4,187,828 A | 2/1980 | Schmid |
| 4,384,564 A | 5/1983 | Smith et al. |
| 4,485,757 A | 12/1984 | Ebner |
| 4,627,950 A | 12/1986 | Matsui et al. |
| 4,643,740 A | 2/1987 | Nicolson |
| 4,646,710 A | 3/1987 | Schmid et al. |
| 4,681,538 A | 7/1987 | DeLuca et al. |
| 4,684,052 A | 8/1987 | McDonald et al. |
| 4,727,852 A | 3/1988 | Schmid et al. |
| 4,776,862 A | 10/1988 | Wiand |
| 4,811,170 A | 3/1989 | Pammer |
| 4,866,888 A | 9/1989 | Murai et al. |
| 4,907,564 A | 3/1990 | Sowa et al. |
| 4,968,326 A | 11/1990 | Wiand |
| 4,974,373 A | 12/1990 | Kawashima et al. |
| 5,062,865 A | 11/1991 | Chen et al. |
| 5,127,197 A | 7/1992 | Brukvoort et al. |
| 5,127,924 A | 7/1992 | Russell |
| 5,213,591 A | 5/1993 | Celikkaya et al. |
| 5,218,949 A | 6/1993 | Tomlinson et al. |
| 5,250,084 A | 10/1993 | Lansell et al. |
| 5,251,802 A | 10/1993 | Bruxvoort et al. |
| 5,318,604 A | 6/1994 | Gorsuch et al. |
| 5,377,568 A | 1/1995 | Hauser |
| 5,377,659 A | 1/1995 | Tank et al. |
| 5,383,443 A | 1/1995 | Buyens |
| 5,438,973 A | 8/1995 | Schmid et al. |
| 5,454,750 A | 10/1995 | Cosmano et al. |
| 5,492,771 A | 2/1996 | Lowder et al. |
| 5,496,386 A | 3/1996 | Broberg et al. |
| 5,511,718 A | 4/1996 | Lowder et al. |
| 5,544,643 A | 8/1996 | Bauer et al. |
| 5,571,296 A | 11/1996 | Barber, Jr. et al. |
| 5,578,098 A | 11/1996 | Gagliardi et al. |
| 5,616,065 A | 4/1997 | Egglhuber |
| 5,643,055 A | 7/1997 | Linzell |
| 5,660,320 A | 8/1997 | Hoffmuller et al. |
| 5,707,509 A | 1/1998 | Hartweg |
| 5,840,089 A | 11/1998 | Chesley et al. |
| 5,846,269 A | 12/1998 | Shiue et al. |
| 5,855,314 A | 1/1999 | Shiue et al. |
| 5,913,305 A | 6/1999 | Hauser |
| 5,924,917 A | 7/1999 | Benedict et al. |
| 5,935,407 A | 8/1999 | Nenov et al. |
| 5,964,210 A | 10/1999 | Hodsden |
| 5,975,988 A | 11/1999 | Christianson |
| 6,056,794 A | 5/2000 | Stoetzel et al. |
| 6,065,462 A | 5/2000 | Hodsden et al. |
| 6,070,570 A | 6/2000 | Ueoka et al. |
| 6,102,024 A * | 8/2000 | Buljan et al. ............ 125/21 |
| 6,194,068 B1 | 2/2001 | Ohashi et al. |
| 6,194,086 B1 | 2/2001 | Nenov et al. |
| 6,228,133 B1 | 5/2001 | Thurber et al. |
| 6,279,564 B1 | 8/2001 | Hodsden |
| 6,286,498 B1 | 9/2001 | Sung |
| 6,311,684 B1 | 11/2001 | Hodsden et al. |
| 6,319,108 B1 | 11/2001 | Adefris et al. |
| 6,368,198 B1 | 4/2002 | Sung et al. |
| 6,463,921 B2 * | 10/2002 | Shimazaki et al. ............ 125/21 |
| 6,613,113 B2 | 9/2003 | Minick et al. |
| 6,679,243 B2 | 1/2004 | Sung |
| 6,755,720 B1 | 6/2004 | Ishizaki |
| 6,783,442 B2 * | 8/2004 | Lukschandel et al. ........ 451/162 |
| 6,790,126 B2 | 9/2004 | Wood et al. |
| 6,797,023 B2 | 9/2004 | Knapp et al. |
| 6,830,598 B1 | 12/2004 | Sung |
| 6,858,050 B2 | 2/2005 | Palmgren |
| 6,899,920 B2 | 5/2005 | Meyer |
| 6,915,796 B2 | 7/2005 | Sung |
| 6,939,413 B2 | 9/2005 | Crockett |
| 7,089,925 B1 | 8/2006 | Lin et al. |
| 7,124,753 B2 | 10/2006 | Sung |
| 7,134,430 B2 | 11/2006 | Kim et al. |
| 7,261,752 B2 | 8/2007 | Sung |
| 7,306,508 B2 | 12/2007 | Kawasaki et al. |
| 7,435,276 B2 | 10/2008 | Chen et al. |
| 7,556,558 B2 | 7/2009 | Palmgren |
| 7,704,127 B2 | 4/2010 | Taniguchi et al. |
| 7,926,478 B2 | 4/2011 | Nakai et al. |
| 8,037,878 B2 | 10/2011 | Kitagawa et al. |
| 8,206,472 B2 | 6/2012 | Tani et al. |
| 8,257,572 B2 | 9/2012 | Castro et al. |
| 8,291,895 B2 * | 10/2012 | Sudarshan et al. ............ 125/21 |
| 8,425,640 B2 | 4/2013 | Liebelt et al. |
| 8,677,986 B2 | 3/2014 | Kazahaya et al. |
| 8,707,944 B2 | 4/2014 | Morita et al. |
| 8,720,429 B2 | 5/2014 | Lange et al. |
| 8,802,602 B2 | 8/2014 | Schmitjes et al. |
| 2001/0025457 A1 | 10/2001 | Tselesin |
| 2002/0010068 A1 | 1/2002 | Komatsu |
| 2002/0077054 A1 | 6/2002 | Sung |
| 2003/0084894 A1 | 5/2003 | Sung |
| 2003/0121212 A1 | 7/2003 | Minick et al. |
| 2003/0134577 A1 | 7/2003 | Coad |
| 2003/0140914 A1 | 7/2003 | Lukschandel et al. |
| 2004/0107648 A1 | 6/2004 | Sung |
| 2004/0112359 A1 | 6/2004 | Sung |
| 2004/0244789 A1 | 12/2004 | Jentgens |
| 2005/0018642 A1 | 1/2005 | Nakamura |
| 2005/0103320 A1 | 5/2005 | Ebner |
| 2006/0016127 A1 | 1/2006 | Sung |
| 2006/0083688 A1 | 4/2006 | Singaram et al. |
| 2006/0194038 A1 | 8/2006 | You et al. |
| 2006/0258268 A1 | 11/2006 | Miyata et al. |
| 2007/0023027 A1 | 2/2007 | Nakai et al. |
| 2007/0051354 A1 | 3/2007 | Sung |
| 2007/0051355 A1 | 3/2007 | Sung |
| 2007/0151388 A1 | 7/2007 | Yazawa et al. |
| 2007/0151554 A1 | 7/2007 | Song et al. |
| 2007/0261690 A1 | 11/2007 | Jentgens |
| 2007/0283944 A1 | 12/2007 | Hukin |
| 2008/0053000 A1 | 3/2008 | Palmgren et al. |
| 2008/0141593 A1 | 6/2008 | Bhatia |
| 2008/0141994 A1 | 6/2008 | Skovgaard-Soerensen et al. |
| 2008/0148650 A1 | 6/2008 | You |
| 2008/0206576 A1 | 8/2008 | Qian et al. |
| 2008/0212733 A1 | 9/2008 | Pop et al. |
| 2008/0261499 A1 | 10/2008 | Tani et al. |
| 2008/0271783 A1 | 11/2008 | Murakami et al. |
| 2009/0064983 A1 | 3/2009 | Sudarshan et al. |
| 2009/0120422 A1 | 5/2009 | Taniguchi |
| 2009/0202781 A1 | 8/2009 | Hall et al. |
| 2009/0242410 A1 | 10/2009 | Castro et al. |
| 2009/0283089 A1 | 11/2009 | Sung |
| 2010/0197202 A1 | 8/2010 | Branagan et al. |
| 2011/0009039 A1 | 1/2011 | Balagani et al. |
| 2011/0039070 A1 | 2/2011 | Liebelt et al. |
| 2011/0045292 A1 | 2/2011 | Tian et al. |
| 2011/0263187 A1 | 10/2011 | Liu et al. |
| 2011/0308371 A1 * | 12/2011 | Morita et al. ............ 83/830 |
| 2012/0037140 A1 | 2/2012 | Campos et al. |
| 2012/0055097 A1 | 3/2012 | Tian et al. |
| 2012/0167482 A1 | 7/2012 | Tian et al. |
| 2012/0216787 A1 | 8/2012 | Morita et al. |

(56) References Cited

U.S. PATENT DOCUMENTS

| | | | |
|---|---|---|---|
| 2013/0000211 A1 | 1/2013 | Upadhyay et al. |
| 2013/0032129 A1 | 2/2013 | Ontani et al. |
| 2013/0061535 A1 | 3/2013 | Tian et al. |
| 2013/0084786 A1 | 4/2013 | Rehrig et al. |
| 2013/0092143 A1 | 4/2013 | Sudarshan et al. |
| 2013/0205676 A1 | 8/2013 | Tian et al. |
| 2013/0219801 A1 | 8/2013 | Liebelt et al. |
| 2014/0007513 A1 | 1/2014 | Rehrig et al. |
| 2014/0011434 A1 | 1/2014 | Puzemis et al. |
| 2014/0013675 A1 | 1/2014 | Tian et al. |
| 2014/0017984 A1 | 1/2014 | Rehrig et al. |
| 2014/0017985 A1 | 1/2014 | Tian et al. |
| 2014/0150766 A1 | 6/2014 | Che et al. |
| 2014/0311472 A1 | 10/2014 | Tian et al. |

FOREIGN PATENT DOCUMENTS

| | | |
|---|---|---|
| CN | 1488480 A | 4/2004 |
| CN | 1583336 A | 2/2005 |
| CN | 1721113 A | 1/2006 |
| CN | 1739927 A | 3/2006 |
| CN | 101066614 A | 11/2007 |
| CN | 201283606 Y | 8/2009 |
| CN | 101564828 A | 10/2009 |
| CN | 101712135 A | 5/2010 |
| DE | 10-2004-043718 A1 | 3/2006 |
| EP | 0237784 | 6/1991 |
| EP | 916449 A1 | 5/1999 |
| EP | 1475463 | 11/2004 |
| EP | 1685934 A1 | 8/2006 |
| EP | 2497602 A1 | 9/2012 |
| GB | 876605 A | 9/1961 |
| GB | 962357 A | 7/1964 |
| GB | 1254365 A | 11/1971 |
| GB | 1342359 A | 1/1974 |
| JP | 61-71949 | 4/1986 |
| JP | 63-102868 | 5/1988 |
| JP | 30-79264 | 4/1991 |
| JP | 5016066 A | 1/1993 |
| JP | H07-096454 | 4/1995 |
| JP | H08-126953 | 5/1996 |
| JP | H09-150314 | 6/1997 |
| JP | H09-155631 | 6/1997 |
| JP | H09-254006 A | 9/1997 |
| JP | 10-034544 | 2/1998 |
| JP | H10-118938 | 5/1998 |
| JP | 10-256581 | 9/1998 |
| JP | H10-328932 A | 12/1998 |
| JP | H11-216657 A | 8/1999 |
| JP | H11-216658 A | 8/1999 |
| JP | 11-277398 | 10/1999 |
| JP | 2957571 B1 | 10/1999 |
| JP | H11-320379 | 11/1999 |
| JP | H11-347911 | 12/1999 |
| JP | 2000-052226 | 2/2000 |
| JP | 2000-071160 | 3/2000 |
| JP | 2000-071162 | 3/2000 |
| JP | 2000-094297 | 4/2000 |
| JP | 2000-158318 | 6/2000 |
| JP | 2000-158319 | 6/2000 |
| JP | 2000-218504 | 8/2000 |
| JP | 2000-246542 | 9/2000 |
| JP | 2000-246654 A | 9/2000 |
| JP | 2000-263452 | 9/2000 |
| JP | 3-104553 B2 | 10/2000 |
| JP | 2000-271872 | 10/2000 |
| JP | 2000-286902 | 10/2000 |
| JP | 2001-054850 | 2/2001 |
| JP | 2001-105295 | 4/2001 |
| JP | 2001-113519 A | 4/2001 |
| JP | 2001-259993 A | 9/2001 |
| JP | 2001-277092 A | 10/2001 |
| JP | 2001-287146 A | 10/2001 |
| JP | 2001-341076 | 12/2001 |
| JP | 2002172564 A | 6/2002 |
| JP | 2002-205272 | 7/2002 |
| JP | 2002-254286 A | 9/2002 |
| JP | 2002-254327 | 9/2002 |
| JP | 2002-273663 A | 9/2002 |
| JP | 2002-326151 A | 11/2002 |
| JP | 2002-331466 | 11/2002 |
| JP | 2002-361566 A | 12/2002 |
| JP | 2003-231063 A | 8/2003 |
| JP | 2003525130 A | 8/2003 |
| JP | 2003-275970 A | 9/2003 |
| JP | 2003291057 A | 10/2003 |
| JP | 1371438 | 12/2003 |
| JP | 2004-009239 A | 1/2004 |
| JP | 2004-050318 | 2/2004 |
| JP | 31-03807 U | 6/2004 |
| JP | 2004-174680 | 6/2004 |
| JP | 2004-209573 A | 7/2004 |
| JP | 2004-216553 A | 8/2004 |
| JP | 2004-261889 A | 9/2004 |
| JP | 2004-338023 A | 12/2004 |
| JP | 2005-007221 A | 1/2005 |
| JP | 2002036091 A | 2/2005 |
| JP | 2005-238377 A | 9/2005 |
| JP | 2006-007387 A | 1/2006 |
| JP | 37-77285 B2 | 5/2006 |
| JP | 2006-123024 A | 5/2006 |
| JP | 2006123024 A | 5/2006 |
| JP | 2006123055 A | 5/2006 |
| JP | 2006130636 A | 5/2006 |
| JP | 2006-150505 A | 6/2006 |
| JP | 2006-179677 A | 7/2006 |
| JP | 2006-181701 A | 7/2006 |
| JP | 2006-231479 A | 9/2006 |
| JP | 2006-272499 A | 10/2006 |
| JP | 2007-021677 A | 2/2007 |
| JP | 2007-044870 A | 2/2007 |
| JP | 2007-061976 A | 3/2007 |
| JP | 2007-152485 | 6/2007 |
| JP | 2007-152486 | 6/2007 |
| JP | 2007-196312 A | 8/2007 |
| JP | 2007-196329 A | 8/2007 |
| JP | 2007-203393 A | 8/2007 |
| JP | 2007-203417 A | 8/2007 |
| JP | 2007-237628 A | 9/2007 |
| JP | 2007-253268 A | 10/2007 |
| JP | 2007-268627 A | 10/2007 |
| JP | 2007-281176 A | 10/2007 |
| JP | 2007-307261 A | 11/2007 |
| JP | 2008-068332 A | 3/2008 |
| JP | 2008-221406 A | 9/2008 |
| JP | 2009-066689 A | 4/2009 |
| JP | 2008221406 A | 9/2009 |
| JP | 2010-000583 A | 1/2010 |
| JP | 2010-000584 A | 1/2010 |
| JP | 2010000583 A | 1/2010 |
| JP | 2010000584 A | 1/2010 |
| JP | 2010131698 A | 6/2010 |
| JP | 2010-284754 | 12/2010 |
| JP | 2011-016208 A | 1/2011 |
| JP | 2011098407 A | 5/2011 |
| KR | 2000-0033534 A | 6/2000 |
| KR | 2001-0055980 A | 7/2001 |
| KR | 10-2006-0006856 A | 1/2006 |
| RU | 2078680 C1 | 5/1997 |
| RU | 83210 | 5/2009 |
| TW | 442370 B | 6/2001 |
| TW | I291389 B | 12/2007 |
| WO | 98/05466 | 2/1998 |
| WO | 98/35784 A1 | 8/1998 |
| WO | 99/46077 | 9/1999 |
| WO | 00/61324 | 10/2000 |
| WO | 01/04227 A2 | 1/2001 |
| WO | 2004/069479 | 8/2004 |
| WO | 2005/064677 A1 | 7/2005 |
| WO | 2006070534 | 7/2006 |
| WO | 2007/039934 | 4/2007 |
| WO | 2006/083688 | 8/2007 |
| WO | 2008/000072 | 1/2008 |

(56) References Cited

FOREIGN PATENT DOCUMENTS

| WO | 2009/064345 | A2 | 5/2009 |
|---|---|---|---|
| WO | 2009-158507 | A2 | 12/2009 |
| WO | 2010071198 | | 6/2010 |
| WO | 2010/125083 | | 11/2010 |
| WO | 2010/125085 | A1 | 11/2010 |
| WO | 2011/020105 | A2 | 2/2011 |
| WO | 2011/020109 | A2 | 2/2011 |
| WO | 2011055692 | A1 | 5/2011 |
| WO | 2011-161613 | | 8/2011 |
| WO | 2012/092614 | A2 | 7/2012 |
| WO | 2013/040423 | A2 | 3/2013 |
| WO | 2013/049204 | A2 | 4/2013 |
| WO | 2013/147892 | A1 | 10/2013 |
| WO | 2014/004982 | A1 | 1/2014 |
| WO | 2014/004991 | A1 | 1/2014 |
| WO | 2014/005009 | A1 | 1/2014 |
| WO | 2014/005015 | A1 | 1/2014 |
| WO | 2014/005028 | A1 | 1/2014 |
| WO | 2014/005037 | A1 | 1/2014 |
| WO | 2014172611 | A1 | 10/2014 |

OTHER PUBLICATIONS

Patel, "Characterizing Fatigue and Fracture Response of Medical Grade Nickel-Titanium Alloys by Rotary Beam Testing", Fort Wayne Metals Research Products Corporation, Fort Wayne, Indiana, USA, Presented at the ASTM Symposium on Fatigue and Fracture of Medical Metallic Materials and Devices Dallas, TX Nov. 2005.

Enomoto, Toshiyuki et al "Development of a Resinoid Diamond Wire Containing Metal Power for Slicing a Sliving Ingot." Annals of the CIRP. 32.1 (1983): 273-276.

Jun Sugawara et al., "Development of a fixed abrasive-grain wire saw with less cutting loss" SEI Technical Review No. 58, Jun. 2004, pp. 7-11.

International Search Report for PCT/US2012/031699 mailed Nov. 16, 2012.

Daisuke Ide, "Resin Bond Diamond wire for slicing ceramics", Idustrial Diamond Review vol. 2/2007, pp. 32-34.

Y. Chiba et al., "Development of a high-speed manufacturing method for electroplated diamond wire tools", Annals of the CIRP vol. 52/1/2003, pp. 281-284.

Osamu Kamiya et al., "Diamond and metal bonding by active solder for micro-cutting wire", Int. J. of Mdern Physics B, vol. 20, Nos. 25-27 (2006) pp. 3932-3937.

Fujisawa, M, et al, "Precision Sawing with Wire Saw." Annals of the CIRP. 32.1 (1983): 87-90.

Conversion US mesh (tamis)—microns: http://www.granuloshop.com/Conversion.htm (Sep. 2, 2003).

International Search Report for PCT/US2010/045643 mailed Apr. 29, 2011.

International Search Report for PCT/US2013/048565 mailed Aug. 27, 2013.

International Search Report for PCT/US2013/048587 mailed Sep. 17, 2013.

International Search Report for PCT/US20013/048609 mailed Sep. 2, 2013.

International Search Report for PCT/US2013/048511 mailed Aug. 27, 2013.

International Search Report for PCT/US2013/048491 mailed Aug. 26, 2013.

Patel, Mitesh M., "Characterizing Fatigue and Fracture Response of Medical Grade Nickel—Titanium Alloys by Rotary Beam Testing," Presented at the ASTM Symposium on Fatigue and Fracture of Medical Metallic Materials and Devices, Dallas, Texas, Nov. 2005, 12 pages.

International Search Report for PCT/US2011/086240 mailed Aug. 27, 2012.

Handbook of Thermoset Plastics, 2nd edition, p. 28, 1998.

International Search Report for PCT/US2010/045647 mailed Apr. 29, 2011.

U.S. Appl. No. 13/930,577, filed Jun. 28, 2013.

International Search Report for PCT/US2012/055529 mailed Feb. 21, 2013.

International Search Report for PCT/US2012/057334 mailed Mar. 28, 2013.

Higashi, Taisuke et al., Development of Low Melting Temperature Coating Materials for High Performance Diamonds Wire Saw: Effect of an Additive on Mechanical Properties.

Nakamura Choko Co., Ltd., "Company Report", Mar. 31, 2010, 10 pages.

International Search Report for PCT/US2013/048549 mailed Sep. 11, 2013.

International Search Report for International Application No. PCT/JP2010/069294 dated Nov. 22, 2010.

International Search Report for PCT/US2014/034611 mailed Aug. 28, 2014.

Copper and Copper Alloys Jan. 1, 2001 (exerpt)—Davis, ASM International; pp. 127-130.

* cited by examiner

ABRASIVE ARTICLES INCLUDING ABRASIVE PARTICLES BONDED TO AN ELONGATED SUBSTRATE BODY HAVING A BARRIER LAYER, AND METHODS OF FORMING THEREOF

This application claims priority to and the benefit of U.S. Provisional Patent Application 61/541,007 which was filed on Sep. 29, 2011, and is incorporated herein by reference in its entirety.

BACKGROUND

1. Field of the Disclosure

The following is directed to abrasive articles, and particularly abrasive articles including abrasive particles secured to an elongated body.

2. Description of the Related Art

A variety of abrasive tools have been developed over the past century for various industries for the general function of removing material from a workpiece, including for example sawing, drilling, polishing, cleaning, carving, and grinding. In particular respect to the electronics industry, abrasive tools suitable for slicing single crystal ingots of material to form wafers, such as silicon wafers is particularly pertinent. As the industry continues to mature, the ingots have increasingly larger diameters, and it has become acceptable to use loose abrasives and wire saws for such works due to yield, productivity, affected layers, dimensional constraints and the like factors.

Wire saws include abrasive tools that include abrasive particles attached to a long length of wire that can be spooled at high speeds to produce a cutting action. While circular saws, and the like, are limited to a cutting depth of less than the radius of the blade, wire saws can have greater flexibility allowing for cutting of straight or profiled cutting paths.

Certain conventional wire saws are produced by sliding steel beads over a metal wire or cable, wherein the beads are typically separated by spacers and the beads are covered by abrasive particles which are commonly attached by either electroplating or sintering. However, electroplating and sintering operations can be time consuming and thus costly ventures, prohibiting rapid production of the wire saw abrasive tool. Some attempts have been made to attach abrasive particles via chemical bonding processes, such as brazing, but such fabrication methods reduce the flexibility of the wire saw, and the braze coating becomes susceptible to fatigue and premature failure. Other wire saws may use a resin to bond the abrasives to the wire. Unfortunately, the resin bonded wire saws tend to wear quickly and the abrasives are lost well before the useful life of the particles is realized.

Accordingly, the industry continues to need improved wire saw abrasive tools and method of forming such tools.

SUMMARY

According to one aspect, an abrasive article including a substrate in the form of an elongated member having a core and a barrier layer in direct contact with a peripheral surface of the core. The barrier layer consists essentially of tin. A bonding layer is overlying the elongated substrate and abrasive particles are secured in the bonding layer According to another aspect, an abrasive article includes a substrate including an elongated member and having a core and a barrier layer overlying a peripheral surface of the core. The barrier layer includes an inner layer made of tin and an outer layer overlying the inner layer. A bonding layer is overlying the barrier layer of the substrate and abrasive particles are secured in the bonding layer.

In yet another aspect, an abrasive article includes a substrate including an elongated member and having a core and a barrier layer overlying a peripheral surface of the core. The abrasive article comprises a fatigue life of at least about 300,000 cycles under rotary beam fatigue test at a stress of 700 MPa. A bonding layer is overlying the barrier layer of the substrate and abrasive particles are secured in the bonding layer.

According to yet another aspect, an abrasive article includes a substrate including a wire having a core and a barrier layer overlying a peripheral surface of the core. The barrier layer overlies a peripheral surface of the core and is made essentially of tin, wherein the barrier layer overlies essentially the entire peripheral surface of the core and comprises a thickness sufficient to limit penetration of hydrogen into the core of the substrate. A bonding layer is overlying the barrier layer of the substrate and abrasive particles are secured in the bonding layer.

According to another aspect, a method of forming an abrasive article includes providing a substrate having an elongated body including a barrier layer overlying a peripheral surface of a core, the barrier layer comprising an inner layer consisting essentially of tin. The method further includes forming a bonding layer overlying the substrate and securing abrasive particles in the bonding layer.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is generally directed to abrasive articles incorporating an elongated body to which abrasive particles are secured. In particular, the abrasive articles are suitable for processes using long lengths of abrasive articles, which can include for example wire sawing applications, commonly employed in the electronics industry to segment boules of material, including single crystal material. Alternatively, the abrasive article may be used in the cutting or sectioning of other materials, including for example, stone, other natural materials, metals, ceramics, polymers, and the like.

Figure 1:
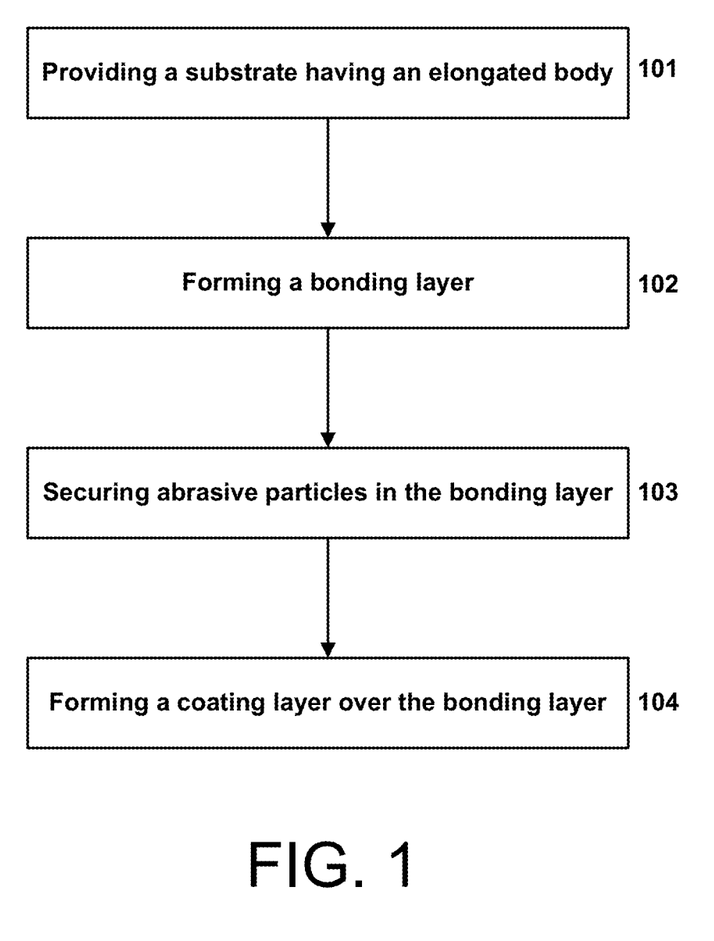
FIG. 1 includes a flowchart illustrating a method of forming an abrasive article in accordance with an embodiment.

FIG. 1 includes a flowchart providing a method of forming an abrasive article in accordance with an embodiment. The forming process can be initiated at step 101 by providing a substrate having an elongated body. The elongated body can have a length defined by a dimension extending along the longitudinal axis of the elongated body. The substrate can provide a surface for affixing abrasive materials thereto, thus facilitating the abrasive capabilities of the abrasive article.

In accordance with an embodiment, the process of providing a substrate can include a process of providing a substrate in the form of a wire, such that the substrate consists essentially of wire. In fact, the wire substrate may be connected to a spooling mechanism. For example, the wire can be fed between a feed spool and a receiving spool. The translation of the wire between the feed spool and the receiving spool can facilitate processing, wherein the wire is translated through desired forming processes to form the component layers of the finally-formed abrasive article while being translated from the feed spool to the receiving spool.

In accordance with an embodiment, the substrate can be an elongated member having an aspect ratio of length:width of at least 10:1. In other embodiments the substrate can have an aspect ratio of at least about 100:1, such as at least 1000:1, or even at least about 10,000:1. The length of the substrate is the longest dimension measured along a longitudinal axis of the substrate. The width is a second longest (or in some cases smallest) dimension of the substrate measured perpendicular to the longitudinal axis.

Furthermore, the substrate in the form of elongated member can have a length of at least about 50 meters. However, other substrates of embodiments herein can be longer, having an average length of at least about 100 meters, such as at least about 500 meters, at least about 1,000 meters, or even 10,000 meters.

Furthermore, the substrate can have a width that may not be greater than about 1 cm. Other substrates of the embodiments can be smaller, having an average width of not greater than about 0.5 cm, such as not greater than about 1 mm, not greater than about 0.8 mm, or even not greater than about 0.5 mm. Still, the substrate can have an average width of at least about 0.01 mm, such as at least about 0.03 mm. It will be appreciated that the substrate can have an average width within a range between any of the minimum and maximum values noted above. Moreover, in the case that a substrate is a wire having a generally circular cross-sectional shape, it will be appreciated that reference to width is reference to a diameter.

In further reference to the process of providing a substrate, it will be appreciated that the substrate can be spooled from a feed spool to a receiving spool at a particular rate to facilitate processing. For example, the substrate can be spooled at a rate of not less than about 5 m/min from the feed spool to the receiving spool. In other embodiments, the rate of spooling can be greater, such that it is at least about 8 m/min, at least about 10 m/min, at least about 12 m/min, or even at least about 14 m/min, or even at least about 20 m/min. The rate of spooling can be within a range between any of the minimum and maximum values noted above. It will be appreciated the spooling rate can represent the rate at which the finally-formed abrasive article can be formed.

According to an aspect, the substrate can include a core and a barrier layer overlying a peripheral surface of the core. In certain instances, the core can include an inorganic material, such as a metal or metal alloy material. Some substrates can include core made of a transition metal element as recognized in the Periodic Table of Elements. For example, the core of the substrate may incorporate elements of iron, nickel, cobalt, copper, chromium, molybdenum, vanadium, tantalum, tungsten, and a combination thereof. In accordance with a particular embodiment, the substrate can include iron, and more particularly may be steel.

In certain embodiments, the core of the substrate can be an elongated member, such as a multifilament wire, which may include a plurality of filaments braided together. That is, the core of the substrate can be formed of many smaller wires wound around each other, braided together, or fixed to another object, such as a central core wire. Certain designs may utilize piano wire as a suitable structure for the core.

According to one aspect, the substrate can include a barrier layer overlying a peripheral surface of a core. The barrier layer can be in direct contact with the peripheral surface of the core, and more particularly, can be bonded directly to the peripheral surface of the core. In one embodiment, the barrier layer can be bonded to the peripheral surface of the core and may define a diffusion bond region between the barrier layer and the core, characterized by an interdiffusion of at least one metal element of the core and one element of the barrier layer.

According to one embodiment, one portion of the process of providing a substrate can include forming a barrier layer overlying a core to form the substrate. The barrier layer can be formed through various techniques, including for example, printing, spraying, dip coating, die coating, deposition, and a combination thereof. In accordance with an embodiment, the process of forming the barrier layer can include a low temperature process. For example, the process of forming the barrier layer can be conducted at a temperature of not greater than about 400° C., such as not greater than about 375° C., not greater than about 350° C., not greater than about 300° C., or even not greater than about 250° C. Furthermore, after forming the barrier layer it will be appreciated that further processing can be undertaken including for example cleaning, drying, curing, solidifying, heat treating and a combination thereof. The barrier layer can serve as a barrier to chemical impregnation of the core material by various chemical species (e.g., hydrogen) in subsequent plating processes. Moreover, the barrier layer may facilitate improved mechanical durability.

In one embodiment, the barrier layer can be a single layer of material. The barrier layer can be in the form of a continuous coating, overlying the entire peripheral surface of the core. For example, the barrier layer can be a single layer of material consisting essentially of tin. In one particular instance, the barrier layer can contain a continuous layer of tin having a purity of at least 99.99% tin. Notably, the barrier layer can be a substantially pure, non-alloyed material. That is, the barrier layer can be a metal material (e.g., tin) made of a single metal material.

In other embodiments, the barrier layer can be a metal alloy. For example, the barrier layer can include a tin alloy, such as composition including a combination of tin and another metal, including transition metal species such as copper, silver, and the like. Some suitable tin-based alloys can include tin-based alloys including silver, and particularly Sn96.5/Ag3.5, Sn96/Ag4, and Sn95/Ag5 alloys. Other suitable tin-based alloys can include copper, and particularly including Sn99.3/Cu0.7 and, Sn97/Cu3 alloys. Additionally, certain tin-based alloys can include a percentage of copper and silver, including for example, Sn99/Cu0.7/Ag0.3, Sn97/Cu2.75/Ag0.25 and, Sn95.5/Ag4/Cu0.5 alloys.

In another aspect, the barrier layer can be formed into two discrete layers. For example, the barrier layer can include an inner layer. In one embodiment, the inner layer can include the characteristics of the barrier layer described above. That is, for example, the inner layer can include a continuous layer of material including tin, and more particularly consisting essentially of tin.

The inner layer and outer layer can be formed of different materials relative to each other. That is, for example, at least one element is present within one of the layers can be absent within one of the other layers. In one particular embodiment, the outer layer can include an element that is not present within the inner layer.

According to an embodiment, the inner layer and outer layer can be directly contacting each other, such as the outer layer is directly overlying the inner layer. Accordingly, the inner layer and outer layer can be joined at an interface extending along the length of the substrate.

In accordance with another embodiment, the outer layer can be formed such that it includes an inorganic material, such as a metal or a metal alloy. More particular instances, the outer layer can include a transition metal element. For example, in one certain embodiment, the outer layer can include nickel. In another embodiment, the outer layer can be formed such that it consists essentially of nickel.

In certain instances, the outer layer can be formed in the same manner as the inner layer. However, it is not necessary that the outer layer be formed in the same manner as the inner layer. In accordance with an embodiment, the outer layer can be formed through such processes including plating, spraying, printing, dipping, die coating, deposition, and a combination thereof. In certain instances, the outer layer of the barrier layer can be formed at relatively low temperatures, such as temperatures not greater than about 400° C., not greater than about 375° C., not greater than about 350° C., not greater than about 300° C., or even not greater than 250° C. It will be appreciated that formation of the outer layer in such a manner may facilitate limiting the impregnation of unwanted species within the core and/or inner layer. According to one particular process, the outer layer can be formed though a non-plating process, such as die coating. Moreover, the processes used to form the outer layer may include other methods including for example heating, curing, drying, and a combination thereof.

In accordance with an embodiment, the inner layer can be formed to have a particular average thickness suitable for acting as a chemical barrier layer. For example, the barrier layer can have an average thickness of at least about 0.2 microns, at least about 0.3 microns, at least about 0.5 microns, such at least about 0.8 microns, or even at least about 1 micron. Still, the average thickness of the inner layer may be not greater than about 8 microns, such as not greater than about 7 microns, not greater than about 6 microns, not greater than about 5 microns, or even not greater than about 4 microns. It will be appreciated that the inner layer can have an average thickness within a range between any of the minimum and maximum thicknesses noted above.

The outer layer of the barrier layer can be formed to have a particular thickness. For example, in one embodiment the average thickness of the outer layer can be at least about 0.5 microns, such as at least about 0.8 microns, at least about 1 micron, or at least about 2 microns. Still, in certain embodiments, the outer layer can have an average thickness that is not greater than about 12 microns, not greater than about 10 microns, not greater than about 8 microns, not greater than about 7 microns, or even not greater than about 5 microns. It will be appreciated that the outer layer of the barrier layer can have an average thickness within a range between any of the minimum and maximum thicknesses noted above.

Notably, in at least embodiment, the inner layer can be formed to have a different average thickness than the average thickness of the outer layer. Such a design may facilitate improved impregnation resistance to certain chemical species while also providing suitable bonding structure for further processing. For example, in other embodiments the inner layer can be formed to have an average thickness that is greater than the average thickness of the outer layer. However, in alternative embodiments, the inner layer may be formed to have an average thickness so that it is less than the average thickness of the outer layer.

Notably, the barrier layer (including the inner layer and outer layer) can be formed to have an average thickness that is not greater than about 10 microns. In other embodiments, the average thickness of the barrier layer may be less, such as not greater than about 9 microns, not greater than about 8 microns, not greater than about 7 microns, or even not greater than about 6 microns. Still, the average thickness of the barrier layer can be at least about 0.5 microns, such as least about 0.8 microns, at least about 1 micron, or even at least about 2 microns.

Furthermore, the abrasive articles herein can form a substrate having a certain resistance to fatigue. For example, the substrates can have an average fatigue life of at least 300,000 cycles as measured through a Rotary Beam Fatigue Test or a Hunter Fatigue Test. The test can be a MPIF Std. 56. The rotary beam fatigue test measures the number of cycles up to wire break at designated stress (e.g. 700 MPa), i.e. constant stress or the stress under which the wire was not ruptured in a cyclic fatigue test with a number of repeating cycles of up to 106 (e.g. stress represents fatigue strength). In other embodiments, the substrate may demonstrate a higher fatigue life, such as least about 400,000 cycles, at least about 450,000 cycles, at least about 500,000 cycles, or even at least about 540,000 cycles. Still, the substrate may have a fatigue life that is not greater than about 2,000,000 cycles.

After providing the substrate at step 101, the process can continue at step 102 by forming a bonding layer overlying the substrate. It will be appreciated that the bonding layer can overlie the barrier layer, and in fact, can be in direct contact with the barrier layer. In one embodiment, the barrier layer can be directly bonded to the barrier layer, and more particularly, can be directly bonded to an outer layer of the barrier layer.

Suitable methods of forming the bonding layer include processes such as plating, spraying, printing, dipping, and a combination thereof. In one particular embodiment, the bonding layer can be formed through a bonding process, and more particularly, an electroless plating or electroplating process. Notably, the barrier layer may limit the impregnation of chemical species into the core of the substrate during such operations as plating.

Suitable materials for forming the bonding layer can include metals or metal alloys. Some suitable metal species can include copper, nickel, tungsten, tin, molybdenum, iron, cobalt, and the like, which may particularly include transition metal elements. For example, the bonding layer can include nickel, and in fact, the bonding layer material can be made entirely of nickel. Other bonding layers can use an alloy, such as a copper-based metal alloy material or a nickel-based metal alloy material. For example, the bonding layer can be a metal alloy comprising copper and zinc. In copper-based metal bonding layers, alloying metals, such as nickel, tungsten, tin, and other metal elements may be added in minor amounts as compared to the content of copper to form a copper-based metal alloy. In an alternative embodiment, the bonding layer can consist essentially of copper.

In one particular embodiment, the outer layer of the barrier layer can include nickel and the bonding layer can include nickel, however, the content of nickel between the outer layer and the barrier layer can be different. Such a construction may facilitate improved bonding between the component layers and improved abrasive capabilities of the abrasive article. For example, the content of nickel within the barrier layer can be greater than the content of nickel within the bonding layer, since the bonding layer may utilize a metal (e.g., a nickel-based alloy) having a lower content of nickel than the outer layer (e.g., pure nickel). Alternatively, the bonding layer may have a greater content of nickel compared to the outer layer of the barrier layer, wherein the outer layer of the barrier layer may utilize a metal having a lower content of nickel (e.g., a nickel-based alloy) as compared to the metal of the bonding layer (e.g., pure nickel).

After forming a bonding layer over the substrate at step 102, the process can continue at step 103 by securing abrasive particles within the bonding layer. The process of securing abrasive particles within the bonding layer can be completed such that the abrasive particles are secured to the substrate to form a suitable abrasive article. Notably, in one embodiment, the process of securing the abrasive particles into the bonding layer can be a distinct step from the other processes, including for example, the process of forming the bonding layer. For example, the abrasive particles can be secured by various processes including pressing, rolling, spraying, impregnating, coating, gravity coating, dipping, die coating, electrostatic coating, and a combination thereof.

In one particular embodiment, the process of securing the abrasive particles within the bonding layer can include a pressing process wherein the abrasive particles are pressed into the bonding layer material. For example, the substrate can be passed between two rollers. A content of abrasive particles may also be contained between the rollers, such that upon moving the substrate between the rollers, the abrasive particles can be pressed into the bonding layer between the rollers. It will be appreciated, that the abrasive particles may be provided on the surface of the rollers and as the substrate passes between the rollers, a fraction of the abrasive particles on the surface of the rollers are embedded within the bonding layer. Alternatively, the abrasive particles may be injected into the region between the two rollers proximate to the substrate, such that abrasive particles captured between the rollers can be pressed and embedded within the bonding layer.

Alternatively, the processes of securing the abrasive particles in the bonding layer can be completed in combination with another process. For example, the bonding layer and layer of abrasive particles can be deposited on the substrate simultaneously, in a single process. According to a particular embodiment, the substrate can be translated through a mixture containing a suspension of abrasive particles in the bonding layer material, wherein upon translating the substrate through the mixture the suspension attaches and bonds to the substrate to form a bonding layer having a layer of abrasive particles secured therein. It will be appreciated that other processes can be used that combine the forming methods of forming the bonding layer and securing the abrasive particles in the bonding layer.

The abrasive particles can include materials such as oxides, carbides, nitrides, borides, oxynitrides, oxyborides, diamond, and a combination thereof. In certain embodiments, the abrasive particles can incorporate a superabrasive material. For example, one suitable superabrasive material includes diamond. In particular instances, the abrasive particles can consist essentially of diamond.

In one embodiment, the abrasive particles can include a material having a Vickers hardness of at least about 10 GPa. In other instances, the abrasive particles can have a Vickers hardness of at least about 25 GPa, such as at least about 30 GPa, at least about 40 GPa, at least about 50 GPa, or even at least about 75 GPa. Still, abrasive particles for use in the embodiments herein can have a Vickers hardness that is not greater than about 200 GPa, such as not greater than about 150 GPa, or even not greater than about 100 GPa. It will be appreciated that the abrasive particles can have a Vickers hardness within a range between any of the minimum and maximum values noted above.

The abrasive particles can have an average particle size that is determined in part by the desired end use of the abrasive article. In certain instances, the abrasive particles can have an average size that is not greater than about 500 microns. In other instances, the average particle size of the abrasive particles can be smaller, such that the average particle size is not greater than about 400 microns, not greater than about 300 microns, not greater than about 250 microns, not greater than about 200 microns, not greater than about 150 microns, or even not greater than about 100 microns. In accordance with an embodiment, the average particle size of the abrasive particles can be at least about 0.1 microns, such as at least about 0.5 microns, or even at least about 1 micron. It will be appreciated that the abrasive particles can have an average particle size within a range between any of the minimum and maximum values noted above. Such values may or may not account for additional coatings overlying the abrasive particles.

The abrasive particles may include a grit coating layer over the exterior surfaces of the abrasive particles, such that the abrasive particles have a core/shell structure, wherein the core comprises abrasive particles described above, and a grit coating layer overlying the core in the form of a shell layer. Suitable materials of the grit coating layer can include metal or metal alloy materials. In accordance with one particular embodiment, the grit coating layer can include a transition metal element, such as titanium, vanadium, chromium, molybdenum, iron, cobalt, nickel, copper, silver, zinc, manganese, tantalum, tungsten, and a combination thereof. Certain grit coating layers can include nickel, such as a nickel alloy, and even alloys have a majority content of nickel, as measured in weight percent as compared to other species present within the coating layer composition. In more particular instances, the grit coating layer can include a single metal species. For example, the grit coating layer can consist essentially of nickel. Alternatively, the grit coating layer can include copper, and may be made of a copper-based alloy, and even more particularly, can consist essentially of copper.

The abrasive particles can be formed such that the grit coating layer can overly at least about 25%, at least about 30%, at least about 40%, or even at least about 50% of the exterior surface area of the abrasive particle (i.e., the core). In other embodiments, the coverage of the grit coating layer for each abrasive particle can be greater, such that the grit coating layer overlies at least about 75%, at least about 80%, at least about 90%, at least about 95%, or essentially the entire exterior surface of the abrasive particle.

The grit coating layer can be in direct contact with the abrasive particle (i.e., the core) and may be bonded directly to an external surface of each of the abrasive particles. In particular embodiments, the grit coating layer can be electroless plated directly to an external surface of the abrasive particles.

For certain abrasive articles according to the embodiments herein, the grit coating layer can be present in an amount of at least about 5% of the total weight of each of the abrasive particles. In other embodiments, the amount of the grit coating layer can be greater, such that each of the abrasive particles is made to include at least about 10%, at least about 20%, or even at least about 30% of the grit coating layer for the total weight of each of the abrasive particles. Still, in certain instances, the amount grit coating layer present on each of the abrasive particles may be limited, such as not greater than about 100%, not greater than about 60%, not greater than about 55%, not greater than about 50%, not greater than about 45%, not greater than about 40%, or even not greater than about 38% of the total weight of each of the abrasive particles. It will be appreciated that the amount of the grit coating layer present on each of the abrasive particles can be within a range between any of the minimum and maximum percentages noted above.

According to one embodiment, the grit coating layer can have an average thickness of not greater than about 12 microns. In other instances, the thickness of the grit coating layer can be less, such as not greater than about 10 microns, not greater than about 8 microns, not greater than about 6 microns, or even not greater than about 5 microns. Still, the average thickness of the grit coating layer can be at least about 0.2 microns, at least about 0.5 microns, such as at least about 0.7 microns, or even at least about 1 micron. It will be appreciated that the average thickness of the grit coating layer can be within a range between any of the minimum and maximum values noted above.

The grit coating layer can be formed to have an average thickness of not greater than about 80% of an average particle size of the abrasive particles as measured by the core. According to one embodiment, the grit coating layer can be formed such that it has an average thickness of not greater than about 70%, not greater than about 60%, not greater than about 50%, such as not greater than about 40%, or even not greater than about 30% of the average particle size of the abrasive particles. In yet other embodiments, the average thickness of the grit coating layer can be at least about 1%, at least about 5%, at least about 10%, or even at least about 12% of an average particle size of the abrasive particles. It will be appreciated that the average thickness of grit coating layer can be within a range between any of the minimum and maximum values noted above.

Figure 2A:
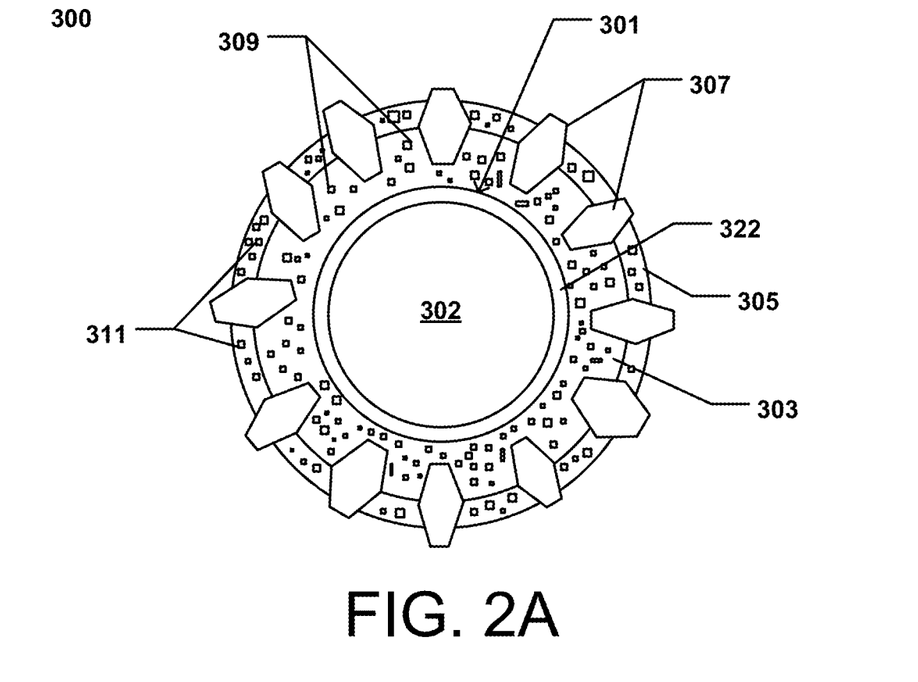
FIGS. 2A and 2B include cross-sectional illustrations of portions of abrasive articles in accordance with an embodiment.
Figure 2B:
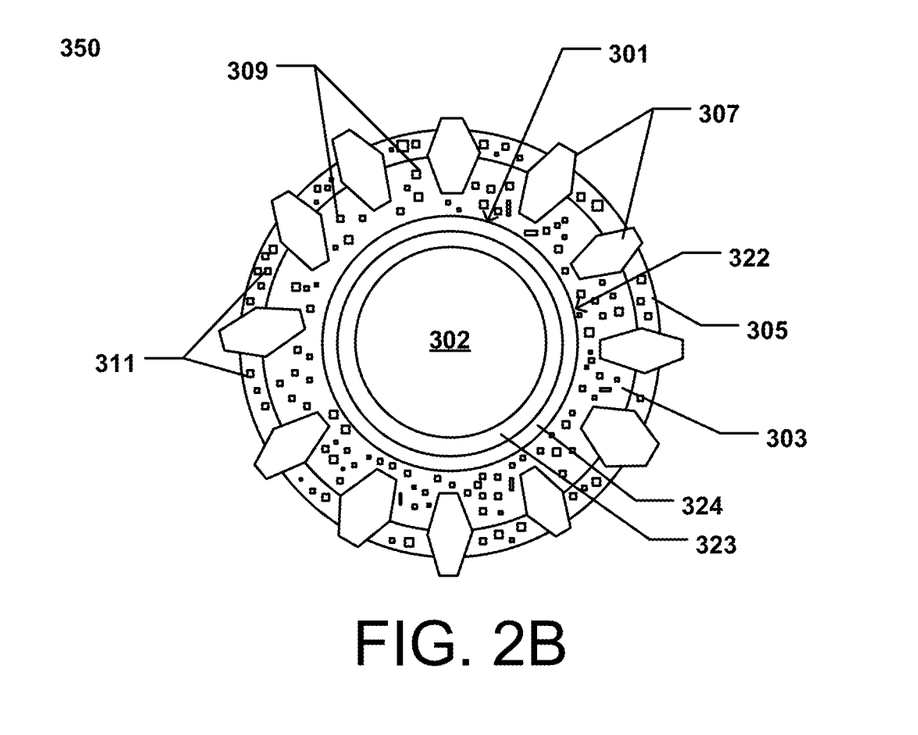

FIGS. 2A and 2B include cross-sectional illustrations of abrasive articles in accordance with embodiments. As illustrated, the abrasive article 300 of FIG. 2A includes a substrate 301, including a core 302 and a barrier layer 322 overlying and surrounding the core 302. As illustrated, the core 301 can have a circular cross-sectional shape. The article 300 can further include a bonding layer 303 overlying the barrier layer 322. In one particular embodiment, the bonding layer 303 can overlie a majority of the exterior surfaces of the abrasive particles 307 and barrier layer 322, and more particularly at least about 90% of the total exterior surfaces, and still more particularly overlie essentially all of the exterior surfaces of the abrasive particles 307 and barrier layer 322.

In certain designs, the bonding layer 303 can incorporate a filler 309. The filler 309 can include a particulate, which may serve to improve the abrasive capabilities and wear characteristics of the bonding layer 303 and the overall abrasive article 300. For example, the filler 309 can include secondary abrasive particles, different than the abrasive particles 307. However, the particulate of the filler 309 can be significantly different than the abrasive particles 307, particularly with regard to size, which can include for example, a filler 309 having an average particle size that is substantially less than the average particle size of the abrasive particles 307. For example, the particulate of the filler 309 can have an average particle size that is at least about 2 times less than the average particle size of the abrasive particles 307. In certain embodiments, the particulate of the filler may have an average grain size that is even smaller, such as on the order of at least 3 times less, such as at least about 5 times less, at least about 10 times less, at least about 100 times less, or even at least about 1000 times less than the average particle size of the abrasive particles 307. Certain abrasive articles may use a filler 309 including a particulate having an average particle size within a range between about 2 times and about 1000 times less, or between about 10 times to about 1000 times than the average particle size of the abrasive particles 307.

The particulate of the filler 309 within the bonding layer 303 can include materials such as carbides, carbon-based materials (e.g. fullerenes), borides, nitrides, oxides, and a combination thereof. In particular instances, the particulate can be a superabrasive material such as diamond, cubic boron nitride, or a combination thereof. Accordingly, it will be appreciated that the particulate of the filler 309 can be the same material as that of the abrasive particles 307. In other instances, the particulate of the filler 309 can include a different material than the material of the abrasive particles 307.

According to other designs, the filler 309 can be made of a metal or metal alloy material. For example, the filler 309 can include particulate that comprises a metal. Suitable metal materials can include transition elements. Particular transition metal elements suitable for use in the particulate of the filler 309 can include copper, silver, iron, cobalt, nickel, zinc, molybdenum, chromium, niobium, and a combination thereof.

As further illustrated in FIG. 2A, the abrasive article 300 can include a coating layer 305 overlying the external surface 311 of the bonding layer 303 and portions of the abrasive particles 307. As further illustrated, the coating layer 305 can include a coating filler material 311 contained within the matrix of the coating layer material 305, and may be placed within the coating layer 305 such that substantially all of the coating filler material 311 is surrounded by the coating layer material 305. Notably, the coating layer filler 311 can include particulate having the same features of the particulate of the filler material 309 within the bonding layer 303. Additionally, the filler 311 may be provided within the coating layer 305 for improved mechanical properties, such as improved elasticity, hardness, toughness, and wear resistance. In particular embodiments, the particulate making up the coating filler material 311 can be the same as the particulate of the filler material 309 within the bonding layer 303. Still, in other embodiments, the particulate of the coating filler material 311 can be different than the particulate of the filler material 309 of the bonding layer 303.

The abrasive article 350 of FIG. 2B includes a substrate 301, including a core 302 and a barrier layer 322 overlying and surrounding the core 302. As illustrated, the barrier layer 322 can include an inner layer 323 overlying and directly contacting a peripheral surface of the core 302. The barrier layer 322 can further include an outer layer 324 overlying and directly contacting the inner layer 323. The article 350 can further include a bonding layer 303 overlying the barrier layer 322, such that it substantially covers the upper surface of the substrate 301, and notably can overlie essentially all the outer, peripheral surface of the outer layer 324 of the barrier layer 322. Additionally, as illustrated, the abrasive article 350 can include many of the same features described in the abrasive article 300 of FIG. 2A.

Figure 3:
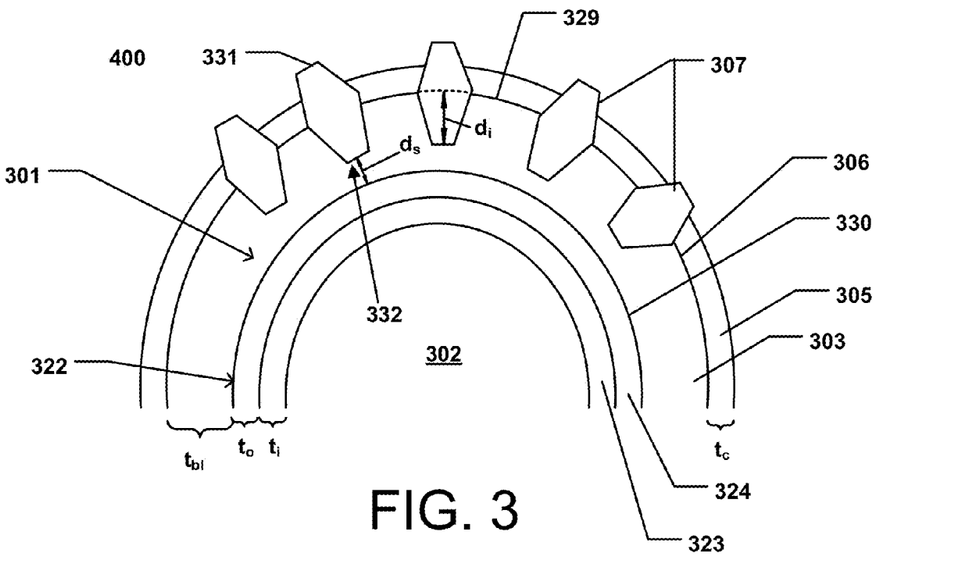
FIG. 3 includes a cross-sectional illustration of a portion of an abrasive article in accordance with an embodiment.

FIG. 3 includes a cross-sectional illustration of a portion of an abrasive article in accordance with an embodiment. As illustrated, the abrasive article 400 can include a substrate 301 including a core 302 having a circular cross-sectional shape, and a barrier layer 322 overlying the core 302 including an inner layer 323 and an outer layer 324 as described herein. The abrasive article 400 can further include a bonding layer 303 overlying the interface 330 defined by the barrier layer 322 and the bonding layer 303. Additionally, as illustrated, the abrasive article 400 includes a coating layer 305 overlying the bonding layer 303 and abrasive particles 307 contained within a portion of the bonding layer 303 and the coating layer 305.

In accordance with a particular embodiment, the bonding layer can be formed to have an average thickness ($t_{bl}$) with a certain relationship to the average particle size of the abrasive particles 307. For example, the bonding layer 303 can have an average thickness ($t_{bl}$) that is at least about 10% of the average particle size of the abrasive particles 307. In other embodiments, the average thickness ($t_{bl}$) of the bonding layer 303 is greater, such that it is at least about 20%, at least about 30%, at least about 40%, at least about 50%, at least about 60%, or even at least about 80% of the average particle size of the abrasive particles 307. For certain abrasive articles, the bonding layer 303 can have an average thickness ($t_{bl}$) of not greater than about 150%, not greater than about 120%, not greater than about 100%, not greater than about 90%, not greater than about 85%, not greater than about 80%, or even not greater than about 75% of the average particle size of the abrasive particles 307. It will be appreciated that the average thickness ($t_{bl}$) of the bonding layer can be within a range between any of the minimum and maximum percentages noted above.

In one embodiment, the average thickness ($t_{bl}$) of the bonding layer 303 can be at least about 1 micron. In other cases, the bonding layer 303 can be more robust, having an average thickness on the order of at least about 2 microns, at least about 5 microns, or even at least about 10 microns, at least about 20 microns, at least about 30 microns, or at least about 50 microns. Still, in particular instances, the bonding layer can have an average thickness ($t_{bl}$) not greater than about 100 microns, not greater than about 90 microns, not greater than about 80 microns, not greater than about 70 microns, or not greater than about 60 microns. It will be appreciated that the average thickness ($t_{bl}$) of the bonding layer can be within a range between any of the minimum and maximum values noted above.

The abrasive particles 307 may be embedded within the bonding layer 303 at a particular average indentation depth ($d_i$) to control the abrasive characteristics of the final-formed abrasive article. The average indentation depth ($d_i$) is the average depth at which the abrasive particles 307 are secured within the bonding layer 303, measured as the distance between the upper surface 306 of the bonding layer 303 and the portion of the respective abrasive grain at the greatest distance from the upper surface 306 within the bonding layer 303 as illustrated in FIG. 3. According to one embodiment, a majority of the abrasive particles 307 can protrude from an upper surface of the bonding layer 303. In a more particular embodiment, essentially all of the abrasive particles 307 can protrude above an upper surface of the bonding layer 303 such that at least a portion of essentially all of the abrasive particles 307 have a portion external to the bonding layer 303.

In accordance with an embodiment, the abrasive particles 307 can be embedded within the bonding layer 303 at an average indentation depth ($d_i$) of at least about 25%, such as at least about 30%, or even at least about 40% of the average particle size of the abrasive particles 307. In other abrasive articles, the abrasive particles 307 may be embedded to a greater degree within the bonding layer 303, such that the average indentation depth ($d_i$) is at least about 50%, such as at least about 60%, or even at least about 75% of the average particle size of the abrasive particles 307. Still, the abrasive article 400 can be formed such that the average indentation depth ($d_i$) can be not greater than about 97%, not greater than about 95%, not greater than about 90%, not greater than about 85%, not greater than about 80%, or not greater than about 75% of the average particle size of the abrasive particles 307. It will be appreciated that the average indentation depth ($d_i$) of the bonding layer can be within a range between any of the minimum and maximum percentages noted above.

As illustrated, in FIG. 3, a representative abrasive grain 331 is placed within the bonding layer 303 in a manner such that the bottom surface 332 of the abrasive grain 331, otherwise the surface of the abrasive grain 331 closest to the interface 330 defined by the barrier layer 322 and the bonding layer 303. The distance between the bottom surface 332 of the abrasive grain and the interface 330 can be considered an average spacing distance ($d_s$), wherein the average spacing distance is an average calculated from at least 10 measurements taken under SEM at a suitable magnification and resolution for accurate measurement. Notably, the spacing distance ($d_s$) can be at least about 2% of the average thickness of the bonding layer 303. In other embodiments, the spacing distance ($d_s$) can be greater, such that it is at least about 5%, at least about 10%, at least about 20%, at least about 30%, or even at least about 40% of the average thickness ($t_{bl}$) of the bonding layer 303. Still, in particular embodiments, the spacing distance ($d_s$) can be not greater than about 50%, such as not greater than about 45%, not greater than about 40%, not greater than about 35%, or even not greater than about 30% of the average thickness ($t_{bl}$) of the bonding layer 303. It will be appreciated that the average spacing distance ($d_s$) can be within a range between any of the minimum and maximum percentages noted above.

Certain abrasive articles can be formed such that a certain amount of the abrasive particles are spaced away from the interface 330 defined by the barrier layer 322 and the bonding layer 303. For example, a minor amount (less than 50%, but greater than 0%) of the total number of abrasive particles 307 within the abrasive article 400 can be spaced away from the interface 330 by a spacing distance ($d_s$). Other abrasive articles can be formed such that a majority content (greater than 50%) of the total amount of abrasive particles 307 are spaced away at a spacing distance ($d_s$) from the interface 330. For example, in certain embodiments, at least about 60%, such as at least about 70%, at least about 80%, at least about 85%, of the abrasive particles of the abrasive article 400 are spaced away from the interface 330 defined by the barrier layer 322 and the bonding layer 303.

As further illustrated in FIG. 3, the coating layer 305 can be formed such that it has an average thickness ($t_c$) to provide suitable abrasive characteristics in the final-formed abrasive article. In certain instances, the average thickness ($t_c$) is not greater than about 50% of the average particle size of the abrasive particles 307. For example, the coating layer 305 can have an average thickness that is not greater than about 40%, not greater than about 30%, or even not greater than about 20% of the average particle size of the abrasive particles 307. Still, the coating layer 305 can have an average thickness not greater than about 50%, not greater than about 45%, not greater than about 40%, not greater than about 35%, not greater than about 30% of the average particle size of the abrasive particles 307. It will be appreciated that the average thickness ($t_c$) of the coating layer 305 can be within a range between any of the minimum and maximum percentages noted above.

The coating layer 305 can be formed such that it has an average thickness ($t_c$) that is less than the average thickness ($t_{bl}$) of the bonding layer 303. For example, the average thickness of the coating layer 305 relative to the average thickness ($t_{bl}$) of the bonding layer 303 can be described as a layer ratio ($t_c:t_{bl}$). In certain instances, the layer ratio can be at least about 1:2. In other instances, the layer ratio ($t_c:t_{bl}$) can be at least about 1:3, such at least about 1:4, and can be particularly within a range between about 1:2 and about 1:5, or even between about 1:2 and about 1:4.

In one embodiment, the barrier layer can be formed such that it has a thickness ratio ($t_i:t_o$) between an average thickness of the inner layer ($t_i$) and an average thickness of the outer layer ($t_o$). In accordance with an embodiment, the thickness ratio can be within a range between about 3:1 and about 1:3, such as within a range between about 2.5:1 and about 1:2.5, within a range between about 2:1 and about 1:2, within a range between about 1.8:1 and about 1:1.8, within a range between about 1.5:1 and about 1:1.5, or even within a range between about 1.3:1 and about 1:1.3.

Certain abrasive articles herein may utilize a coating layer 305 having an average thickness ($t_c$) of not greater than about 25 microns. In other instances, the coating layer 305 may be thinner, such that the average thickness ($t_c$) is not greater than about 20 microns, not greater than about 18 microns, such as on the order of not greater than about 15 microns, or even not greater than about 12 microns. Still, the average thickness ($t_c$) of the coating layer 305 can be at least about 2 microns, such as at least about 5 microns, or at least about 8 microns. It will be appreciated that the average thickness ($t_c$) of the coating layer 305 can be within a range between any of the minimum and maximum percentages noted above.

EXAMPLE

The following describes an exemplary abrasive article formed according to the processes herein. An exemplary sample (S1) is formed by making a substrate from core of high strength steel wire having an average diameter of approximately 120 microns coated with a barrier layer of pure tin and having an average thickness of about 2 microns.

Diamond grains with average size of about 15 microns are then bonded on the substrate within a 3 microns of bonding layer of nickel. The formation of the nickel bonding layer is done in a electroplating process.

Two conventional samples are formed, C1 and C2. Conventional sample 1 (C1) is formed in a similar manner as S1, except that it does not have a barrier layer. Conventional sample C1 is formed by electroplating 5 microns of a bonding layer of nickel, imbedding diamond grains into the bonding layer, and electroplating a coating layer of 3 microns of nickel over the diamond grains. The second conventional sample (C2) is formed by electroplating 8 microns of a bonding layer of copper, imbedding diamond grains into the bonding layer, and electroplating a coating layer of 3 microns of nickel over the diamond grains.

Figure 4:
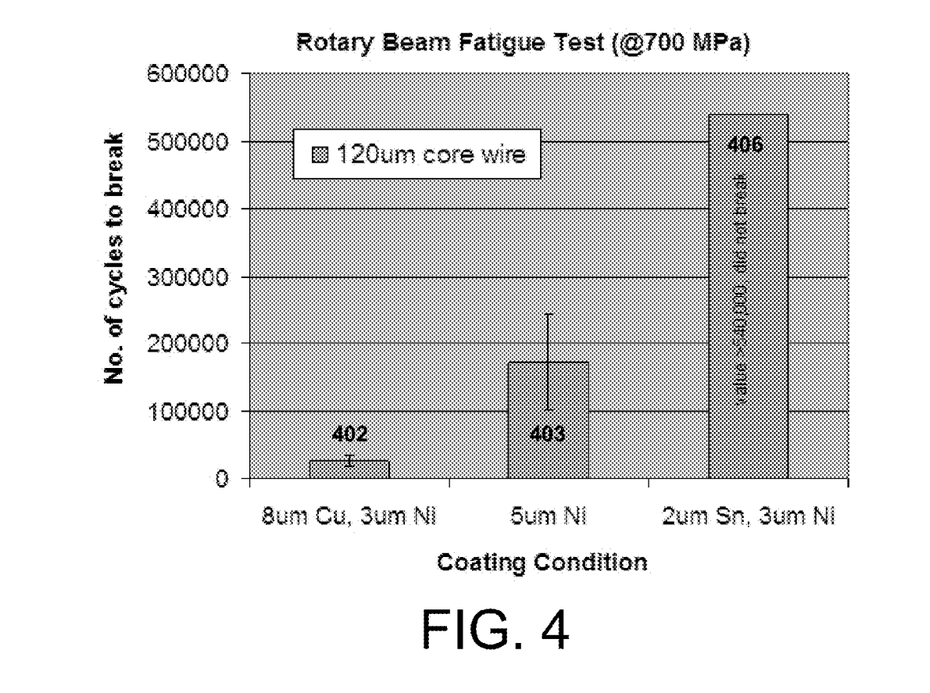
FIG. 4 includes a plot of fatigue life for various conventional samples and samples formed according to embodiments.

For all of the samples (S1, C1 and C2), fatigue life tests are conducted. The test was performed according to standard rotating beam fatigue tests (e.g., MPIF Std. 56) counting the number of cycles used to break the wire under a stress of 700 MPa. The results of the test are illustrated in FIG. 4. Plot 402 and 403 represent samples C1 and C2, respectively. The performance of sample S1 is represented by plot 406. As clearly shown in the plot, sample S1 demonstrated remarkably improved fatigue life In fact, the test was ceased after 540,000 cycles when sample S1 did not break. By contrast, the conventional samples demonstrated a fatigue life significantly worse than the exemplary sample S1. In fact, sample S1 shows over an order of magnitude improvement over sample C1. The improved fatigue life facilitates improved durability and performance in the finally-formed abrasive articles.

The foregoing includes a description of abrasive articles that represent a departure from the state-of-the-art. The abrasive articles herein are directed to wire saw abrasive tools incorporating elongated body members having abrasive particles secured to a substrate including a core and a barrier layer. The applicants found through extensive empirical studies that certain coatings on the core of the substrate such as copper and nickel could cause significant reduction of the fatigue life in the finally-formed abrasive articles. However, and somewhat unexpectedly, it was discovered that certain constructions of barrier layers were suitable at improving the mechanical durability of the abrasive article, and showed such remarkable improvements that testing capabilities were achieved. While the industry has recognized that certain wire saw substrates may utilize a coating, perhaps of metal, none of the conventional teachings are directed to the particular aspects of barrier coatings discovered by the applicants and disclosed herein. The present embodiments utilize a combination of features which result in abrasive articles demonstrating improved durability and performance.

In particular, the abrasive articles herein may be suitable for use in wire sawing applications, particularly for the electronics industry, including slicing or sectioning of single crystal or polycrystalline materials that may be used in photovoltaic devices. The embodiments herein incorporate a combination of features including particular relationships between the bonding layer and the size of abrasive grains, the thickness of the bonding layer and the coating layer, and particular thicknesses of the coating layer with regard to the grit size of the abrasive grains. These features are made possible and enhanced by the forming processes as described herein.

It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:
   a substrate in the form of an elongated member comprising:
   a core; and a barrier layer in direct contact with a peripheral surface of the core, the barrier layer consisting essentially of tin;

a bonding layer overlying the elongated substrate; and abrasive particles secured in the bonding layer, wherein at least about 50% of the abrasive particles are spaced away from an interface between the bonding layer and the barrier layer.

2. The abrasive article of claim 1, wherein the substrate comprises an elongated member having an aspect ratio of length:width of at least about 10:1.

3. The abrasive article of claim 1, wherein the core of the substrate comprises an average width of not greater than about 1 mm.

4. The abrasive article of claim 1, wherein further comprising a fatigue life of at least about 300,000 cycles.

5. The abrasive article of claim 1, wherein the barrier layer comprises an average thickness of not greater than about 10 microns.

6. The abrasive article of claim 1, wherein the barrier layer is a dip-coating layer, wherein the barrier layer is applied at a temperature not greater than about 400° C.

7. The abrasive article of claim 1, wherein the bonding layer directly contacts the barrier layer.

8. The abrasive article of claim 1, wherein the bonding layer comprises an average thickness of at least about 10% of an average particle size of the abrasive particles.

9. The abrasive article of claim 1, further comprising a coating layer overlying the abrasive particles and the bonding layer, wherein the coating layer comprises a material selected from the group of materials consisting of metals, metal alloys, cermets, ceramics, organics and a combination thereof.

10. The abrasive article of claim 1, further comprising a coating layer overlying the abrasive particles and the bonding layer, wherein the average thickness of the coating layer (tc) and the average thickness of the bonding layer (tbl) comprises a layer ratio (tc:tbl) of at least about 1:2.

11. The abrasive article of claim 1, wherein a majority of the abrasive particles are spaced apart from the substrate and wherein a majority of abrasive particles are spaced apart from the barrier layer of the substrate.

12. An abrasive article comprising:
a substrate including an elongated member and comprising:
a core; and
a barrier layer overlying a peripheral surface of the core, the barrier layer comprising an inner layer comprising tin and an outer layer overlying the inner layer;
a bonding layer overlying the barrier layer of the substrate; and
abrasive particles secured in the bonding layer, wherein at least about 50% of the abrasive particles are spaced away from an interface between the bonding layer and the barrier layer.

13. The abrasive article of claim 12, wherein the inner layer comprises a pure, non-alloyed metal, wherein the inner layer consists essentially of tin.

14. The abrasive article of claim 12, wherein the inner layer and outer layer comprise at least one different material relative to each other.

15. The abrasive article of claim 12, wherein the barrier layer comprises a thickness ratio $[t_i:t_o]$ between an average thickness of the inner layer $(t_i)$ and an average thickness of the outer layer $(t_o)$ within a range between about 3:1 and about 1:3.

16. A method of forming an abrasive article comprising:
providing a substrate having an elongated body including a barrier layer overlying a peripheral surface of a core, the barrier layer comprising an inner layer consisting essentially of tin;
forming a bonding layer overlying the substrate; and
securing abrasive particles in the bonding layer, wherein at least about 50% of the abrasive particles are spaced away from an interface between the bonding layer and the barrier layer.

17. The method of claim 16, wherein forming a substrate comprises providing a wire connected to a feed spool and a receiving spool.

18. The method of claim 16, wherein forming a bonding layer comprises a process of depositing the bonding layer over the substrate, and wherein the bonding layer is bonded directly to the barrier layer from a process selected from the group of processes including plating, spraying, printing, dipping, and a combination thereof.

19. The method of claim 16, wherein securing abrasive particles in the bonding layer includes a forming method selected from the group of processes including plating, spraying, rolling, pressing, impregnating, coating, and a combination thereof.

20. The method of claim 16, wherein forming the bonding layer and securing the abrasive particles in the bonding layer is completed simultaneously, wherein the substrate is run through a mixture comprising a suspension including the bonding material and abrasive particles.

* * * * *